United States Patent [19]

Wright

[11] 4,262,394
[45] Apr. 21, 1981

[54] QUARTER-TURN FASTENER

[75] Inventor: Andrew C. W. Wright, Farnham, England

[73] Assignee: Dzus Fastener Co., Inc., West Islip, N.Y.

[21] Appl. No.: 33,725

[22] Filed: Apr. 26, 1979

Related U.S. Application Data

[63] Continuation of Ser. No. 886,149, Mar. 13, 1978, abandoned.

[51] Int. Cl.³ ............................................... A44B 21/00
[52] U.S. Cl. .............................. 24/73 RM; 24/221 R; 411/508
[58] Field of Search ............. 24/221 L, 221 K, 221 R, 24/221 A, 73 RM, 73 SM, 73 PM, 73 PF, 73 P, 109; 85/5 R, 5 P

[56] References Cited

U.S. PATENT DOCUMENTS 3,220,078  11/1965  Preziosi ........................... 24/221 R
3,954,344  5/1976   Nakama .......................... 24/73 RM

FOREIGN PATENT DOCUMENTS 1295049  11/1972  United Kingdom ................. 85/5 P Primary Examiner—Kenneth Dorner
Attorney, Agent, or Firm—Charles R. Hoffmann

[57]  ABSTRACT

The invention relates to a quarter-turn fastener for fastening a panel to a support, the fastener comprising an integrally moulded plastics stud having a head and a shank. The shank extends in use through elongate slots in the panel and support and is formed by a pair of depending resilient legs each of which has at its end remote from the head a transverse flange for engaging the rear surface of the support adjacent the slot in which the stud is mounted. Each leg includes an abutment arranged to engage the side of the slot in the support or in the panel after rotation of the stud through substantially a quarter of a turn to prevent further rotation in the same sense. A resilient camming surface is also provided on each leg for engaging the side of the slot in the support during turning of the stud so that the legs have to be forced towards one another during the rotation and can then be released so that unintentional rotation of the stud from its operative position, in which the flanges of the legs abut the rear surface of the support, to its inoperative position in which the flanges can be withdrawn through the support slot, is prevented.

1 Claim, 6 Drawing Figures

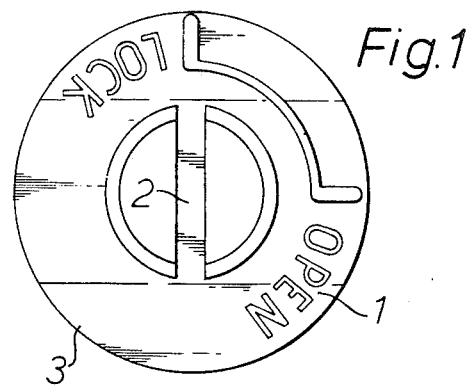
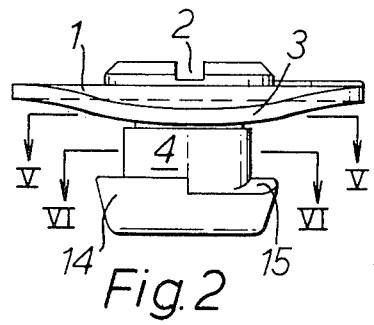
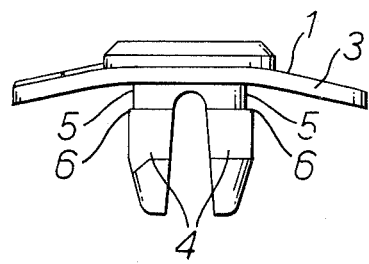
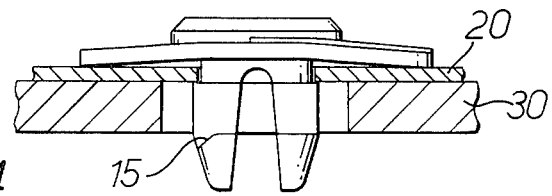
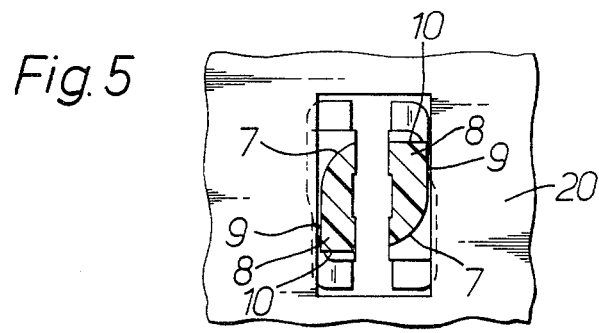
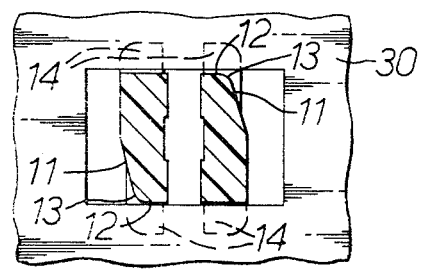

QUARTER-TURN FASTENER

This is a continuation of application Ser. No. 886,149 filed Mar. 13, 1978 (now abandoned).

The present invention relates to so-called quarter turn fasteners for fastening together for example a panel to a support through a pair of aligned slots.

Numerous such fasteners have been proposed, but many of them suffer from the disadvantage that they comprise a multiplicity of parts which makes them complicated to use and also increases their cost.

It is known to have a fastener which comprises a head and a shank, the shank having at its free end a pair of opposed radially outwardly extending flanges which, once the shank of the fastener has been passed through an elongate slot, can be positioned, by rotation of the stud, in abutting relationship behind the support or member through which the elongate slot is formed thereby to lock or fasten the stud to the support. A panel or other member to be fastened to the support is mounted, either permanently or releasably to the stud and thereby the stud is used to fasten the panel to the support.

Unfortunately, such a device has certain disadvantages. For example, some means is additionally required to prevent the fastener rotating, say under vibration, into the position in which it no longer retains the panel on the support, and this has made it necessary in the past to provide, for example, additional latching members on the stud, or detents or protrusions on the rear surface of the support adjacent the elongate slots.

In order to overcome this problem and in accordance with the present invention a quarter-turn fastener comprises an integrally moulded plastics stud having a head to extend through elongate slots in the panel and support, and formed by a pair of depending resilient legs each having at its end remote from the head a transverse flange to engage the rear surface of the support adjacent the slot in which the stud is mounted, each leg including an abutment arranged to engage the side of the slot in the support or in the panel after rotation of the stud through substantially a quarter of a turn to prevent further rotation in the same sense, and a resilient camming surface arranged to engage the side of the slot in the support during turning of the stud, whereby the legs are first forced towards one another and then released, so that unintentional rotation of the stud from an operative position in which the flanges of the legs abut the rear surface of the support and an inoperative position in which the flanges can be withdrawn through the support slot is prevented.

Preferably, the stud can be retained in the slot in the panel and to accomplish this a recess is provided in each of the legs adjacent the head and when the legs are pushed through the slot in the panel they are forced together and then spring outwards when the panel is in alignment with the recesses.

By providing a leaf spring integral with the head and curved concavely with respect to the legs the fastener can be biassed outwardly of the panel so that the flanges on the legs are biassed against the undersurface of the support in use and so that, when the stud is turned into the inoperative position it is automatically moved partially out of the aperture in the support. Alternatively, this biassing can be produced by a non-integral spring or by the formation of the panel and stud to achieve this such as by curving of the panel. However, the leaf spring is preferably formed integrally with the head so as to provide a one-piece fastener.

One example of a fastener according to the present invention will now be described with reference to the accompanying drawings in which:

FIG. 1 is a plan view of the fastener showing the head;

FIG. 2 is a side elevation;

FIG. 3 is a side elevation at 90° to the side elevation of FIG. 2;

FIG. 4 is a side elevation corresponding to FIG. 3 but additionally showing the fastener mounted in a slot in a panel and fastening that panel to a support;

FIG. 5 is a section on the line V—V in FIG. 2 rotated 90° and additionally showing the fastener mounted in a slot in a panel and fastening that panel to a support; and FIG. 6 is a section on the line V1—V1 in FIG. 2 rotated 90° and additionally showing the fastener mounted in a slot in a panel and fastening that panel to a support.

The fastener or stud comprises a head 1 having a slot 2 for engagement by, for example, the tip of a screwdriver and an annular leaf spring 3 which is curved so as to be concave to the remainder of the stud to engage the front surface of a panel 20 to which the stud is, in use, fastened to enable retention of the panel on a support member 30. Additionally, the head of the stud carries at suitable positions, the words "LOCK" and "OPEN" to indicate the respective fastened and unfastened positions.

The shank of the stud is formed by a pair of legs 4 each of which has a part-annular recess 5 formed adjacent the head 1. Into these recesses the edges of a rectangular slot in the panel through which the stud is to be inserted will fit as a snap-fit over the ledges 6 formed at the lower edges of the recesses. Of course, it is necessary for the slot in the panel to be of a suitable size, but there is considerable tolerance in the dimensions of the slot and, of course, if the stud is not required to be fastened to the panel then the dimensions of the slot can be changed as required. When the stud is pushed through the slot in the panel the legs are forced together until the edge of the slot passes over the ledges 6.

At the level of the recessed part of the legs, the legs have, overall, a lozenged-shaped cross-section as can be seen most clearly from FIG. 5. This section is formed by arcuate portions 7 concentric with the central longitudinal axis of the stud and right-angled abutment parts 8 which, when the stud is rotated in the aperture engage, by means of the surfaces 9 or 10, depending on the direction of rotation of the stud, against the sides of the slot in the panel.

The outline of the panel slot is shown in FIG. 5 and the outline of the slot in the support member is shown in FIG. 6. It can be seen that the longer sides of the slots are at right-angles to one another.

Below the section shown in FIG. 5, the legs each include a chamfered face 11, but otherwise the cross-section is square, the chamfered faces 11 merging with the faces 12 in a smoothly curved camming surface 13. The diameter between the camming surfaces 13 is arranged to be wider than the width of the slot in the support member 30 with which the fastener is intended for use, so that, on turning into the position shown in FIG. 6, from the unlatched position, the camming surfaces 13 force the legs together, and as the turning is continued release the legs to their normal, expanded position. Thus, unintentional rotation between the latch and unlatched positions is prevented because of the resilience of the legs and their consequent resistance of any turning movement.

At the very bottom of the legs flanges 14 are formed which, in use, abut the rear surface of the support member adjacent the slot to prevent withdrawal of the fastener when it has been turned to the position shown in FIG. 6. To assist compression of the head spring during rotation and to make turning of the stud easier, the flanges are chamfered as shown at 15.

As can be most clearly seen from FIG. 4, the head spring is somewhat flattened when the fastener is turned to its locking position and the amount of this flattening will depend on the respective thicknesses of the panel 20 and support 30.

I claim:

1. A quarter-turn fastener for fastening a panel to a support, the fastener comprising an integrally molded plastic stud having a head, and a shank, such shank being formed by a pair of depending resilient legs and said legs each having at its end remote from said head a transverse flange, said transverse flange being adapted to engage the rear surface of the support adjacent a slot through which said stud is mounted, each leg further including an abutment adapted to engage the side of at least one of said support slot and a corresponding slot in said panel after rotation of said stud through substantially a quarter of a turn in either direction to prevent further rotation in the same direction, and a resilient camming surface engaging the side of said slot in said support during said turning of said stud whereby said legs are first forced towards one another and then released during said turning to thus prevent unintentional rotation of said stud from an operative position in which said flanges of said legs abut said rear surface of said support to an inoperative position in which said flanges can be withdrawn through said support slot, each leg defining a recess adjacent said head, said recesses being adapted to receive therein the sides of said slot in said panel in a snap-fit when said resilient legs are directed through the slot in the panel to retain said stud in said panel by engagement of the opposing panel surfaces by the undersurface of the head and the distal side of the recess on each leg respectively, the portion of the leg between the head and the flange including an upper part including the recess and a lower part adjacent the flange, the upper part having a substantially lozenged-shaped cross section including an arcuate portion concentric with the central longitudinal axis of the stud and communicating with the abutment, the lower part cross section having a substantially straight sided periphery except for a chamfered section which merges with the straight sides to form the camming surface, each camming surface being smoothly curved and the diameter between the camming surfaces of the legs arranged to be wider than the width of the slot to provide the desired resistance to turning movement, and a leaf spring integrally formed with said head and being curved concavely with respect to said legs whereby said fastener is adapted to be outwardly biased of said slot in said panel.

* * * * *